United States Patent Office 3,252,918
Patented May 24, 1966

3,252,918
CATALYST DEMETALLIZATION
Wayne L. Disegna, Markham, and Robert L. Foster, Homewood, Ill., assignors to Sinclair Research, Inc., Wilmington, Del., a corporation of Delaware
No Drawing. Filed Dec. 27, 1962, Ser. No. 247,509
11 Claims. (Cl. 252—416)

This invention concerns the removal of vanadium and other poisoning metals from a synthetic gel hydrocarbon conversion catalyst which has been contaminated with vanadium and perhaps other metals by use in the high temperature catalytic conversion of feedstocks containing vanadium. The invention is designed for use as part of an overall metals-removal procedure employing a plurality of processing steps to increase the amount of vanadium removable by such procedures. The invention comprises subjecting the catalyst, after regeneration, to treatment with a gas comprising molecular oxygen at a moderately elevated temperature in the presence of a nitrogen oxide, and then removing vanadium from the catalyst. In this treatment an essentially carbon-free catalyst is contacted with the oxygen-containing gas for a time sufficient to convert a significant amount of the vanadium on the catalyst to a higher valence state as evidenced by an increase in vanadium removal in subsequent processing steps as compared to such steps conducted in the absence of the oxygen-containing gas treatment. Copending patent applications Serial Nos. 758,681, filed September 3, 1958 now abandoned; 767,794, filed October 17, 1958 now abandoned; 842,618, filed September 28, 1959 now abandoned; 849,119, filed October 28, 1959 now abandoned; 19,313, fied April 1, 1950 now abandoned; 39,810, filed June 30, 1960 now U.S. Patent Number 3,168,481; 47,598, filed August 4, 1960 now U.S. Patent Number 3,168,482; 53,380, filed September 1, 1960 now U.S. Patent Number 3,122,497; 53,623, filed September 2, 1960 now forfeited; 54,368 now U.S. Patent Number 3,122,512; 54,405 now U.S. Patent Number 3,122,510 and 54,532 now abandoned, filed September 7, 1960; 55,129 now U.S. Patent Number 3,147,209; 55,160 now U.S. Patent Number 3,150,103 and 55,184 now abandoned, filed September 12, 1960; 55,703, filed September 13, 1960 still pending; 55,838, filed September 14, 1960 now abandoned; 67,518, filed November 7, 1960 now U.S. Patent Number 3,208,952; and 73,199, filed December 2, 1960 now U.S. Patent Number 3,151,088; 81,256 and 81,257, filed January 9, 1961 both now abandoned; 122,394, filed July 7, 1961 now U.S. Patent Number 3,168,462 and 191,253, filed April 30, 1962, still pending, all of which are hereby incorporated by reference, describe procedures by which vanadium and other poisoning metals included in a solid oxide hydrocarbon conversion catalyst are removed by dissolving them from the catalyst or subjecting the catalyst, outside the hydrocarbon conversion system, to elevated temperature conditions which put the metal contaminants into the chloride, sulfate or other volatile, water-dispersible or more available form. This invention provides for greater vanadium removal when practiced in conjunction with these and other procedures, and gives better results than heretofore believed possible when using moderate temperatures for the treatment.

Catalytically promoted methods for the chemical conversion of hydrocarbons include cracking, hydrocracking, reforming, hydroforming, etc. Such reactions generally are performed at elevated temperatures, for example, about 300 to 1200° F., more often 600 to 1000° F. Feedstocks to these processes comprise normally liquid and solid hydrocarbons which at the temperature of the conversion reaction are generally in the fluid, i.e. liquid or vapor, state and the products of the conversion frequently are lower-boiling materials.

In particular, cracking of heavier hydrocarbon feedstocks to produce hydrocarbons of preferred octane rating boiling in the gasoline range is widely practiced and uses a variety of solid oxide catalysts to give end products of fairly uniform composition. Cracking is ordinarily effected to produce gasoline as the most valuable product and is generally conducted at temperatures of about 750 to 1100° F., preferbly about 850 to 950° F., at pressures up to about 200 p.s.i.g., preferably about atmospheric to 100 p.s.i.g., and without substantial addition of free hydrogen to the system. In cracking, the feedstock is usually a mineral oil or petroleum hydrocarbon fraction such as straight run or recycle gas oils or other normally liquid hydrocarbons boiling above the gasoline range.

Solid oxide catalysts have long been recognized as useful in catalytically promoting conversion of hydrocarbons. For cracking processes, the catalysts which have received the widest acceptance today are usually activated or calcined predominantly silica or silica-based, e.g. silica-alumina, silica-magnesia, silica-zirconia, etc., compositions in a state of slight hydration and containing small amounts of acidic oxide promoters in many instances. The oxide catalyst may be alumina- or silica-based and ordinarily contains a substantial amount of a gel or gelatinous precipitate comprising a major portion of silica and at least one other material, such as alumina, zirconia, etc. These oxides may also contain small amounts of other inorganic materials, but current practice in catalytic cracking leans more toward the exclusion from the silica hydrate materials of foreign constituents such as alkaline metal salts which may cause sintering of the catalyst surface on regeneration and a drop in catalytic activity. For this reasons, the use of wholly or partially synthetic gel catalysts, which are more uniform and less damaged by high temperatures in treatment and regeneration, is often preferable. Popular synthetic gel cracking catalysts generally contain about 10 to 30 or even up to 60% or more alumina. Two such catalysts are "Aerocat" which contains about 13% $Al_2O_3$, and "High Alumina Nalcat" which contains about 25% $Al_2O_3$, with substantially the balance being silica. The catalyst may be only partially of synthetic material; for example it may be made by the precipitation of silica-alumina on clay, such as kaolinite or halloysite. One such semi-synthetic catalyst contains about equal amounts of silica-alumina gel and clay. Other synthetic gel-containing cracking catalysts contain alumina added to a natural or synthetic silica-alumina base.

The manufacture of synthetic gel catalysts can be performed, for instance (1) by impregnating silica with alumina salts; (2) by direct combination of precipitated (or gelated) hydrated alumina and silica in appropriate proportions; or (3) by joint precipitation of alumina and silica from an aqueous solution of aluminum and silicon salts. Synthetic catalysts may be produced by a combination of hydrated silica with other hydrate bases as, for instance, zirconia, etc. These synthetic gel-type catalysts are activated or calcined before use.

The physical form of the catalyst varies with the type of manipulative process to which it will be exposed. In a fixed-bed process, a series of catalytic reactors may be used, some being on stream and others in the process of cleaning, regeneration, etc. In circulating catalyst systems, such as those of the fluid catalytic and "TCC" processes, catalyst moves through a reaction zone and then through a regeneration zone. In the fluid process, gases are used to convey the catalyst and to keep it in the form of a dense turbulent bed which has no definite upper interface between the dense (solid) phase and the suspended (gaseous) phase mixture of catalyst and gas. This type of processing requires the catalyst to be in the form of a fine powder, generally in a size range of about 20 to 150 microns. In the "TCC" or "Thermofor" process the catalyst is in the form of beads which are conveyed by elevators or in a gas stream. Generally these beads may range in size up to about ½" in diameter. When fresh, the minimum sized bead is generally about ⅛". Other types of process use other forms of catalyst such as tablets or extruded pellets.

One of the most important phases of study in the improvement of catalyst performance in hydrocarbon conversion is in the area of metals poisoning. Although referred to as "metals," these catalyst contaminants may be in the form of free metals or relatively non-volatile metal compounds. It is to be understood that the term "metal" used herein refers to either form.

Various petroleum stocks have been known to contain at least traces of many metals. For example, Middle Eastern crudes contain relatively high amounts of several metal components, while Venezuelan crudes are noteworthy for their vanadium content and are relatively low in other contaminating metals such as nickel. Thus Venezuelan crudes or their fractions make ideal feeds for the present process when the demetallization is essentially the treatment with an oxygen-containing gas in the presence of an oxide of nitrogen at a high temperature, along with other steps designed primarily for vanadium removal. In addition to metals naturally present, including some iron, petroleum stocks have a tendency to pick up tramp iron from transportation, storage and processing equipment. Most of these metals, when present in a stock, deposit in a relatively non-volatile form on the catalyst during the conversion processes so that regeneration of the catalyst to remove coke does not remove these contaminants.

Of the various metals which are to be found in representative hydrocarbon feedstocks some, like the alkali metals, only deactivate the catalyst without changing the product distribution; therefore, they might be considered true poisons. Others such as iron, nickel, vanadium and copper markedly alter the selectivity and activity of cracking reactions if allowed to accumulate. A poisoned catalyst generally produces a higher yield of coke and hydrogen at the expense of desired products, such as gasoline and butanes. For instance, it has been shown that the yield of butane, butylenes and gasoline, based on converting 60 volume percent of cracking feed to lighter materials and coke, dropped from 58.5 to 49.6 volume percent when the amount of nickel on the catalyst increased from 55 p.p.m. to 645 p.p.m. and the amount of vanadium increased from 145 p.p.m. to 1480 p.p.m. in fluid catalytic cracking of a feedstock containing some metal contaminated stocks. Since many cracking units are limited by coke burning or gas handling facilities, increased coke or gas yields require a reduction in conversion of throughput to stay within the unit capacity.

An alternative to letting catalyst metals level increase and activity decrease is to diminish the overall metal content by raising catalyst replacement rates. Either approach, letting metals level increase, or increasing catalyst replacement rates, must be balanced against product value and operating costs to determine the most economic way of operating. The optimum metal level at which to operate any cracking unit will be a function of many factors including feedstock metal content, type and cost of catalyst, overall refinery balance, etc., and can be determined by a comprehensive study of the refinery's operations.

A further alternative, demetallizing the catalyst, which avoids discarding of expensive catalyst and may enable much lower grade, highly metals-contaminated feedstocks to be used, is now possible in this invention. In this process a catalyst contaminated with vanadium by use in converting a vanadium-containing petroleum feedstock may be treated only for vanadium removal, or the catalyst may be treated for nickel and/or iron removal as well.

Commercially used cracking catalysts are the result of years of study and research into the nature of cracking catalysis, and the cost of these catalysts is not negligible. The cost frequently makes highly poisoned feedstocks less desirable to use in cracking operations, even though they may be in plentiful supply, because of their tendency to damage the expensive catalysts. The expense of such catalysts, however, is justified because the composition, structure, porosity and other characteristics of such catalysts are rigidly controlled so that they may give optimum results in cracking. It is important, therefore, that removing poisoning metals from the catalyst does not jeopardize the desired chemical and physical constitution of the catalyst. Although methods have been suggested in the past for removing poisoning metals from a catalyst which has been used for high temperature hydrocarbon conversions, for example, the processes of U.S. Patents 2,481,253; 2,488,718; 2,488,744; 2,668,798 and 2,693,455, the process of this invention is effective to remove vanadium and other metals without endangering the expensive catalyst.

In this invention the hydrocarbon petroleum oils utilized as feedstock for a conversion process may be of any desired type normally utilized in catalytic conversion operations. This feedstock contains vanadium, sometimes as much as 30 to 300 or more p.p.m. and the catalyst may be used as a fixed, moving or fluidized bed or may be in a more dispersed state. For typical operations, the catalytic cracking of the hydrocarbon feed would normally result in a conversion of about 50 to 60% of the feedstock into a product boiling in the gasoline boiling range. The catalytic conversion system also includes a regeneration procedure in which the catalyst is contacted periodically with free oxygen-containing gas in order to restore or maintain the activity of the catalyst by removing carbonaceous deposits. It will be understood that in this specification and claims "regeneration" refers to this carbon burn-off procedure.

In this invention the essentially carbon-free, vanadium-poisoned catalyst is contacted with an oxygen-containing gas in the presence of a nitrogen oxide for a time sufficient to convert a significant amount of the vanadium on the catalyst to the higher valence state. Ordinarily, the catalysts are treated before the poisoning metals have reached an undesirably high level, for instance, about 0.5%, generally no more than about 0.2% maximum, content of vanadium. Prior to oxygen treatment, subjecting the poisoned catalyst sample to magnetic flux may be found desirable to remove any tramp iron particles which may have become mixed with the catalyst.

Regeneration of a catalyst to remove carbon is a relatively quick procedure in most commercial catalytic conversion operations. For example, in a typical fluidized cracking unit, a portion of catalyst is continually being removed from the reactor and sent to the regenerator for contact with air at about 950 to 1200° F., more usually about 1000 to 1150° F. Combustion of coke from the catalyst is rapid, and for reasons of economy only enough air is used to supply the needed oxygen. Average residence time for a portion of catalyst in the regenerator may be on the order of about six minutes and the oxygen content of the effluent gases from the regenerator is desirably less than about ½%. The regeneration of any particular quantum of catalyst is generally regulated to give a carbon content of less than about 2%, usually less than about 0.5%.

After regeneration, the catalyst is treated with oxygen in the presence of an oxide of nitrogen at a moderately elevated temperature. The promoting oxide may be provided, for instance, by premixing the molecular oxygen-containing gas with an oxide of nitrogen such as $N_2O$, $NO$, $N_2O_3$, $N_2O_5$, $NO_3$ and mixtures of the same. Preferably $NO_2$ is used, for its ease of manufacture and storage stability. The promoter is generally used in an amount sufficient to provide at least about 0.1% of the promoter, by weight of the catalyst, during the effective part of the oxygen treatment. At least about 0.2% is preferred and the upper limit of nitrogen oxide promoter content will ordinarily be determined by economic considerations. It usually need be no more than about 1%, although amounts up to 10%, 20% or even more may be used.

The catalyst is in a substantially carbon-free condition during the treatment with oxygen in the presence of the nitrogen oxide. If any significant amount of carbon is present in the catalyst at the start of this treatment, the essential oxygen contact is that continued after carbon removal. In any event, after carbon removal, the oxygen treatment of the essentially carbon-free catalyst is at least long enough to convert a substantial amount of vanadium to a higher valence state, as evidenced by a significant increase, say at least about 10%, preferably at least about 100%, in the vanadium removal in subsequent stages of the process. This increase is over and above that which would have been obtained by the other metals removal steps without the oxygen treatment. The exact length of this oxygen treatment and the amount of vanadium prepared by the treatment for subsequent removal, is dependent upon the temperature and the characteristics of the equipment used. The length of the oxygen treatment may vary from the short time necessary to produce an observable effect in the later treatment say, a quarter of an hour, to a time just long enough not to damage the catalyst. In a relatively static apparatus such as a muffle furnace, the effectiveness of the treatment can increase with the time over a rather extended period; in other types of apparatus, however, such as a flow reactor, where there is more thorough contact of catalyst and gas, little increase in effectiveness has been observed after about four hours of treatment.

The temperature of the treatment with molecular oxygen-containing gas will generally be in the range of about 600 to 1300° F., preferably about 800 to 1100° F., but below a temperature where the catalyst undergoes any substantial deleterious change in its physical or chemical characteristics. Often the catalyst will retain enough heat from the regeneration operation to be subjected to the oxygen treatment without intermediate heating. Also, a lower temperature of treatment generally will reduce the cost of the treating apparaus.

The oxygen-containing gas used in the treatment contains molecular oxygen as an essential active ingredient and there is little significant consumption of oxygen in the treatment. The gas may be oxygen, or a mixture of oxygen with inert gas, such as air or oxygen-enriched air. The partial pressure of oxygen in the treating gas may range widely, for instance, from about 0.05 to 30 atmospheres, but usually the total gas pressure will not exceed about 25 atmospheres. Preferably the oxygen partial pressure does not exceed about 0.5 atmospheres.

The factors of time, partial pressure and extent of vanadium conversion may be chosen with a view to the most economically feasible set of conditions. It is preferred to continue the oxygen treatment for about 1 to 4 hours with a gas containing at least about 1%, preferably at least about 10% oxygen. The maximum practical time of treatment may vary up to 24 hours, depending on the type of equipment used.

The catalyst may pass directly from the promoted oxygen treatment to a vanadium removal treatment especially where this is the only important contaminant, as may be the case when a feed is derived, for example, from Venezuelan crude. Such treatment may be a basic aqueous wash such as described in copending patent applications Serial Nos. 767,794 and 39,810. Alternatively, vanadium may be removed by a chlorination procedure as described in copending application Serial No. 849,199.

Vanadium may be removed from the catalyst after the high temperature treatment with molecular oxygen-containing gas by washing it with a basic aqueous solution. The pH is frequently greater than about 7.5 and preferably the solution contains ammonium ions. The solution preferably is substantially free, before contact with the the catalyst, of any contaminant materials which would remain deposited on the catalyst. The ammonium ions may be $NH_4+$ ions or organic-substituted $NH_4+$ ions such as methyl ammonium and quaternary hydrocarbon radical ammoniums. The aqueous wash solution can be prepared by addition of a dry reagent or a concentrated solution of the reagent to water, preferably distilled or deionized water. Ammonia or methylamine gas may be dissolved directly in water.

The amount of ammonium ion in the solution is sufficient to give the desired vanadium removal and will often be in the range of about 1 to 25 or more pounds per ton of catalyst treated. Five to fifteen pounds is the preferred ammonium range but the use of more than about 10 pounds does not appear to increase vanadium removal unless it increases pH. The temperature of the wash solution does not appear to be significant in the amount of vanadium removed, but may vary within wide limits. The solution may be at room temperature or below, or may be higher. Temperatures above 215° F. require pressurized equipment, the cost of which does not appear to be justified. The temperature, of course, should not be so high and the contact should not be so long as to seriously harm the catalyst. The time of contact also may vary within wide limits, so long as thorough contact between the catalyst and the wash solution is assured. Very short contact times, for example, about a minute, are satisfactory, while the time of washing may last 2 to 5 hours or longer.

After the ammonium wash the catalyst slurry can be filtered to give a cake which may be reslurried with water or rinsed in other ways, such as, for example, by a water wash on the filter, and the rinsing may be repeated, if desired, several times. A repetition of the ammonium wash without other treatments seems to have little effect on vanadium removal if the first washing has been properly conducted but repetition of the basic aqueous ammonium wash after a repeated high temperature promoted oxygen treatment usually does serve to further diminish the vanadium content of the catalyst.

Alternatively, after the high temperature treatment with oxygen-containing gas, treatment of a metals-contaminated catalyst with a chlorinating agent at a moderately elevated temperature is of value in removing vanadium and iron contaminants from the catalyst as volatile chlorides. This treatment is described in copending application Serial No. 849,199. Generally, the major proportion of these volatile chlorides is removed during contact with the chlorinating vapor and where the volatile chlorides are insufficiently removed, a purge with an inert gas such as nitrogen at an elevated temperature may be applied to the chlorinated catalyst. The basic aqueous ammonium wash may be used as a substitute or complement to such a purge.

A conversion to vanadium chloride after the high temperature oxygen treatment preferably makes use of vapor phase chlorination at a moderately elevated temperature, up to about 700° or even 1000° F., wherein the catalyst composition and structure is not materially harmed by the treatment and a substantial amount of the poisoning metals content is converted to chlorides. The conversion to chloride may be performed after sulfiding the poisoning metals, as described below. The chlorination takes place at a temperature of at least about 300° F., preferably about 500 to 650° F. with optimum results usually being obtained near 600° F. The chlorinating agent is essentially anhydrous, that is, if changed to the liquid state no separate aqueous phase would be observed in the reagent.

The chlorinating reagent is a vapor which contains chlorine or sometimes HCl, preferably in combination with carbon or sulfur. Such reagents include molecular chlorine but preferably are mixtures of chlorine with, for example, a chlorine substituted light hydrocarbon, such as carbon tetrachloride, which may be used as such or formed in-situ by the use of, for example, a vaporous mixture of chlorine gas with low molecular weight hydrocarbons such as methane, n-pentane, etc.

The stoichiometric amount of chlorine required to convert iron, nickel and vanadium to their most highly chlorinated compounds is the minimum amount of chlorine ordinarily used and may be derived from free chlorine, combined chlorine or the mixture of chlorine with a chlorine compound chlorination promoter described above. However, since the stoichiometric amount of chlorine frequently is in a neighborhood of only 0.001 g./g. of catalyst, a much larger amount of chlorine, say about 1 to 40 percent active chlorinating agent based on the weight of the catalyst is generally used. The amount of chlorinating agent required is increased if any significant amount of water is present on the catalyst so that substantially anhydrous conditions preferably are maintained as regards the catalyst as well as the chlorinating agent. The chlorination promoter is generally used in the amount of about 1 to 5 or 10 percent or more, preferably about 2 to 3 percent, based on the weight of the catalyst for good metals removal; however, even if less than this amount is used, a considerable improvement in metals conversion is obtained over that which is possible at the same temperature using chlorine alone. The amount of chlorination promoter may vary depending upon the manipulative aspects of the chorination step, for example, a batch treatment may sometimes require more promoter than in a continuous treatment for the same degree of effectiveness and results. The chlorine and promoter may be supplied individually or as a mixture to a poisoned catalyst. Such a mixture may contain about 0.1 to 50 parts chlorine per part of promoter, preferably about 1 to 10 parts per part of chlorination promoter. A chlorinating gas comprising about 1 to 30 weight percent chlorine, based on the catalyst, together with one percent or more $S_2Cl_2$ gives good results. Preferably, such a gas provides 1 to 10 percent $Cl_2$ and about 1.5 percent $S_2Cl_2$, based on the catalyst. A "saturated" mixture of $CCl_4$ and $Cl_2$ or HCl can be made by bubbling chlorine or hydrogen chloride gas at room temperature through a vessel containing $CCl_4$; such a mixture generally contains about 1 part $CCl_4$; 5–10 parts $Cl_2$ or HCl.

Conveniently, a pressure of about 0–100 or more p.s.i.g., preferably about 0–15 p.s.i.g. may be maintained in chlorination. The chlorination may take about 5 to 120 minutes, more usually about 20 to 60 minutes, but shorter or longer reaction periods may be possible or needed, for instance, depending on the linear velocity of the chlorinating and purging vapors.

The process of this invention, as pointed out above, is of particular value in the demetallization of catalysts containing vanadium poisons. The removal of vanadium after the high temperature treatment with promoted molecular oxygen-containing gas may be performed by dissolving the vanadium compounds and/or by converting the compounds to volatile and/or soluble vanadium compounds, such as by the chlorination process above described. In addition, the high temperature treatment of this invention may be employed in processes designed for the removal of other poisoning metals, such as nickel, as well as vanadium. Such processes may remove nickel, again, by dissolving nickel compounds directly from the catalyst and/or by converting the nickel compounds to volatile materials and/or materials soluble or dispersible in an aqueous medium, e.g. water or dilute acid.

The water-dispersible form may be one which decomposes in water to produce water-soluble products. The removal procedure for the converted metal may be based on the form to which the metal is converted. The mechanism of the washing steps may be one of simultaneous conversion of nickel and/or vanadium to salt form and removal by the aqueous wash; however, this invention is not to be limited by such a theory.

Conversion of some of the metal poisons, especially nickel, to the sulfate or other water-dispersible form is described in copending applications Serial Nos. 763,834, and 842,618, and may be accomplished, for instance, by subjecting the catalyst to a sulfating gas, that is $SO_2$, $SO_3$ or a mixture of $SO_2$ and $O_2$, at an elevated temperature. Sulfur oxide contact is usually performed at a temperature of about 500 to 1200° F. and frequently it is advantageous to include some free oxygen in the treating gas. Another procedure includes sulfiding the catalyst and converting the sulfide by an oxidation process, after which metal contaminants in water-dispersible form, preferably prior to the ammonium wash, may be dissolved from the catalyst by an aqueous medium.

The sulfiding step can be performed by contacting the poisoned catalyst with elemental sulfur vapors, or more conveniently by contacting the poisoned catalyst with a volatile sulfide, such as $H_2S$, $CS_2$ or a mercaptan. The contact with the sulfur-containing vapor can be performed at an elevated temperature generally in the range of about 500 to 1500° F., preferably about 800 to 1300° F. Other treating conditions can include a sulfur-containing vapor partial pressure of about 0.1 to 30 atmospheres or more, preferably about 0.5 to 25 atmospheres. Hydrogen sulfide is the preferred sulfiding agent. Pressures below atmospheric can be obtained either by using a partial vacuum or by diluting the vapor with gas such as nitrogen or hydrogen. The time of contact may vary on the basis of the temperature and pressure chosen and other factors such as the amount of metal to be removed. The sulfiding may run for, say, up to about 20 hours or more depending on these conditions and the severity of the poisoning. Temperatures of about 900 to 1200° F. and pressures approximating 1 atmosphere or less seem near optimum for sulfiding and this treatment often continues for at least 1 or 2 hours but the time, of course, can depend upon the manner of contacting the catalyst and sulfiding agent and the nature of the treating system, e.g. batch or continuous, as well as the rate of diffusion within the catalyst matrix. The sulfiding step performs the function not only of supplying a sulfur-containing metal compound which may be easily converted to the sulfate or other water-soluble form but also appears to concentrate some metal poisons, especially nickel, at the surface of the catalyst particle.

Oxidation after sulfiding may be performed by a gaseous oxidizing agent to convert metal sulfide to sulfate, including oxysulfate, or other water-dispersible form. Gaseous oxygen, or mixtures of gaseous oxygen with inert gases such as nitrogen, may be brought into contact with the sulfided catalyst at an oxygen partial pressure of about 0.2 atmosphere and upward, temperatures upward of room temperature and usually not above about 1300° F., and times dependent on temperature and oxygen partial pressure. Gaseous oxidation is best carried out near 900° F., about one atmosphere $O_2$ and at very brief contact times. Also, the metal sulfide may be converted to the corresponding sulfate or other water-dispersible form, by a liquid aqueous oxidizing agent such as dilute hydrogen peroxide or hypochlorous acid water solution, as described in copending application Serial No. 842,618. The inclusion in the liquid aqueous oxidizing solution of sulfuric acid or nitric acid has been found greatly to reduce the consumption of peroxide. In addition the inclusion of nitric acid in the oxidizing solution provides for increased vanadium removal. Useful proportions of acid to peroxide to catalyst generally include about 2 to 25 pounds acid (on a 100% basis) to about 1 to 30 pounds or more $H_2O_2$ (also on a 100% basis) in a very dilute aqueous solution, to about one ton of catalyst. A 30% $H_2O_2$ solution in water seems to be an advantageous raw material for preparing the aqueous oxidizing solution. Sodium peroxide or potassium peroxide may be used in place of hydrogen peroxide and in such circumstances, enough extra sulfuric or nitric acid being used to provide one mole of sulfate or two moles of nitrate for each two moles of sodium or potassium.

Another highly advantageous oxidizing medium is an aerated dilute nitric acid solution in water. Such a solution may be provided by continuously bubbling air into a slurry of the catalyst in very dilute nitric acid. Other oxygen-containing gases may be substituted for air. Varying oxygen partial pressure in the range of about 0.2 to 1.0 atmospheres appears to have no effect in time required for oxidation, which is generally at least about 7 to 8 minutes. The oxidizing slurry may contain about 20% solids and provide about five pounds of nitric acid per ton of catalyst. Studies have shown a greater concentration of $HNO_3$ to be of no significant advantage. Other oxidizing agents, such as chromic acid where a small residual $Cr_2O_3$ content in the catalyst is not significant, and similar aqueous oxidizing solutions such as water solutions of manganates and permanganates, chlorites, chlorates and perchlorates, bromites, bromates and perbromates, iodites, iodates and periodates, are also useful. Bromine or iodine water, or aerated, ozonated or oxygenated water, with or without acid, also will oxidize the sulfides to sulfate or other dispersible form. The liquid phase oxidation may also be performed by exposing the sulfided catalyst first to air and then to the aqueous nitric acid solution. The conditions of oxidation can be selected as desired. The temperature can conveniently range up to about 220° F. with temperatures of above about 150° F. being preferred. Temperatures above about 220° F. necessitate the use of superatmospheric pressures and no need for such has been found.

After conversion of nickel sulfide to a dispersible form, the catalyst is washed with an aqueous medium to remove metal sulfate, nitrate, chloride, etc. This aqueous medium, for best removal of nickel is generally somewhat acidic, and this condition may be brought about, at least initially, by the presence of an acid-acting salt or some entrained acidic oxidizing agent on the catalyst. The aqueous medium can contain extraneous ingredients in trace amounts, so long as the medium is essentially water and the extraneous ingredients do not interfere with demetallization or adversely affect the properties of the catalyst. Ambient temperatures can be used in the wash but temperatures of about 150° F. to the boiling point of water are sometimes helpful. Pressures above atmospheric may be used but the results usually do not justify the additional equipment. Where an aqueous oxidizing solution is used, the solution may perform part or all of the metal compound removal simultaneously with the oxidation. In order to avoid undue solution of alumina from a chlorinated catalyst, contact time in this stage is preferably held to about 3 to 5 minutes which is sufficient for nickel removal. Also, since a slightly acidic solution is desirable for nickel removal, this wash preferably takes place before the ammonium wash.

Alternative to the removal of poisoning metals by procedures involving contact of the sulfided or sulfated catalyst with aqueous media, nickel poison and some iron may be removed through conversion of the nickel sulfide to the volatile nickel carbonyl by treatment with carbon monoxide, as described in copending application Serial No. 47,598. In such a procedure the catalyst is treated with hydrogen at an elevated temperature during which nickel contaminant is reduced to the elemental state, then treated, preferably under elevated pressure and at a lower temperature with carbon monoxide, during which nickel carbonyl is formed and flushed off the catalyst surface. Some iron contaminant is also removed by this carbonylation treatment.

Hydrogenation takes place at a temperature of about 800 to 1600° F., at a pressure from atmospheric or less up to about 1000 p.s.i.g. with a vapor containing 10 to 100% hydrogen. Preferred conditions are a pressure up to about 15 p.s.i.g. and a temperature of about 1100 to 1300° F. and a hydrogen content greater than about 80 mole percent. The hydrogenation is continued until surface accumulations of poisoning metals, particularly nickel, are substantially reduced to the elemental state.

Carbonylation takes place at a temperature substantially lower than the hydrogenation, from about ambient temperature to 300° F. maximum and at a pressure up to about 2000 p.s.i.g., with a gas containing about 50–100 mole percent CO. Preferred conditions include greater than about 90 mole percent CO, a pressure of up to about 800 p.s.i.g. and a temperature of about 100–180° F. The CO treatment serves generally both to convert the elemental metals, especially nickel and iron to volatile carbonyls and to remove the carbonyls.

After the ammonium wash, or after the final treatment which may be used in the catalyst demetallization procedure, the catalyst is conducted to its conversion system, for instance to the hydrocarbon conversion reactor or the catalyst regenerator, although it may be desirable first to dry a wet catalyst filter cake or filter cake slurry at say about 250 to 450° F. and also, prior to reusing the catalyst in the conversion operation it can be calcined, say at temperatures usually in the range of about 700 to 1300° F. Prolonged calcination of the catalyst at above about 1100° F. may sometimes be disadvantageous. Calcination removes free water, if any be present, and perhaps some but not all of the combined water, and leaves the catalyst in an active state without undue sintering of its surface. Inert gases frequently may be employed after contact with reactive vapors to remove any of these vapors entrained in the catalyst or to purge the catalyst of reaction products.

The demetallization procedure of this invention has been found to be highly successful when used in conjunction with fluidized catalyst hydrocarbon conversion systems to control the amount of metal poisons on the catalyst. When such catalysts are processed, a fluidized solids technique is recommended for these vapor contact demetallization procedures as a way to shorten the time requirements. Any given step in the demetallization treatment is usually continued for a time sufficient to effect a substantial conversion or removal of poisoning metal and ultimately results in a substantial increase in metals removal compared with that which would have been removed if the particular step had not been performed. After the available catalytically active poisoning metal has been removed, in any removal procedure, further reaction time may have relatively little effect on the catalytic activity of the depoisoned catalyst, although further metals content may be removed by repeated or other treatments.

The actual time or extent of treating depends on various factors and is controlled by the operator according to the situation he faces, e.g. the extent of metals content in the feed, the level of conversion unit tolerance for poison, the sensitivity of the particular catalyst toward a particular phase of the demetallization procedure, etc. Also, the thoroughness of treatment of any quantum of catalyst in commercial practice is balanced against the demetallization rate chosen; that is, the amount of catalyst, as compared to the total catalyst in the conversion system proper, which is subjected to the demetallization treatment per unit of time. A high rate of catalyst withdrawal from the conversion system and quick passage through a mild demetallization procedure may suffice as readily as a more intensive demetallization at a slower rate to keep the total of poisoning metal in the conversion reactor within the tolerance of the unit for poison.

The catalyst to be treated may be removed from the hydrocarbon conversion system—that is, the stream of catalyst which in most conventional procedures is cycled between conversion and regenerating operations—before the poison content reaches about 5000 to 10,000 p.p.m., the poisoning metals being calculated as their common oxides. Generally, at least about 250 or 500 p.p.m. vanadium will be accumulated on the catalyst before demetallization is warranted. A suitable amount, generally a very small portion of the catalyst, is removed from the hydrocarbon conversion system and given the promoted oxygen treatment after the oxidation regeneration which serves to remove carbonaceous deposits. With a continuously circulating catalyst stream, such as in the ordinary "fluid" system this may conveniently be done by the intermittent or continuous removal of a slip-stream of catalyst from the regenerator standpipe. The severity of regeneration is generally such that the catalyst contacted with the nitrogen oxide contains not more than about 0.5% carbon. Where the catalyst is sent to the high temperature treatment with promoted molecular oxygen-containing gas before it is substantially carbon-free, the length of oxygen treatment, as recited above, is reckoned from the time that the catalyst reaches the substantially carbon-free state, that is the state where little, if any, carbon is burned or oxygen consumed even when the catalyst is contacted with oxygen at temperatures conducive to combustion.

The amount of Ni, V or Fe removed in practicing the procedures outlined or the proportions of each which are removed may be varied by proper choice of treating conditions. It may prove necessary, in the case of very severely poisoned catalysts, to repeat one or more treatments to reduce the metals to an acceptable level, perhaps with variations where one metal is greatly in excess. A further significant advantage of the process lies in the fact that the overall metals removal operation, even if repeated, does not unduly deleteriously affect the activity, selectivity, pore structure and other desirable characteristics of the catalyst.

In practice the process could be applied in a refinery by removing a portion of catalyst from the regenerator or regenerator standpipe of the cracking system after a standard regeneration treatment to remove a good part of the carbon, heating this portion of the catalyst inventory in air containing a nitrogen oxide for the length of time found to be sufficient for vanadium removal without catalyst damage, then sulfiding the catalyst. Subsequent treatment may be based upon removal of poisons as vapors, by chlorination and carbonylation, or may be based upon aqueous removal by the use of an ammonium wash or may be based upon aqueous removal by conversion, through chlorination, perhaps preceded by sulfidation, and removal by suitable aqueous washes. The treated catalyst can be returned to the unit, for example, to the regenerator, reducing greatly the new catalyst requirement.

The following examples are illustrative of the invention but should not be considered limiting.

EXAMPLES

A "Nalcat" synthetic gel silica-alumina finely divided fluid-type cracking catalyst composed of about 25% $Al_2O_3$, substantially the rest $SiO_2$ was used in a commercial catalytic cracking conversion unit, using conventional fluidized catalyst techniques, including cracking and air regeneration to convert a feedstock (A) comprising a blend of Wyoming and Mid-Continent gas oils containing about 1.2 p.p.m. vanadium, about 0.3 p.p.m. nickel, about 1.0 p.p.m. iron and about 2 weight percent sulfur. This gas oil blend had a gravity (API) of 24°, a carbon residue of about 0.3 weight percent and a boiling range of about 500 to 1000° F. When this catalyst contained about 315 p.p.m. NiO, 3854 p.p.m. $V_2O_5$ and 0.30% Fe, a batch of this catalyst was removed from the cracking system after regeneration at about 1100° F. and a portion (A) was used to test-crack a petroleum hydrocarbon East Texas gas oil fraction (feedstock B) having the following approximate characteristics.

| | |
|---|---|
| IBP (° F.) | 490–510 |
| 10% | 530–550 |
| 50% | 580–600 |
| 90% | 650–670 |
| EP | 690–710 |
| Gravity (API), degrees | 33–35 |
| Viscosity (SUS) at 100° F. | 40–45 |
| Aniline point, ° F. | 170–175 |
| Pour point, ° F. | 34–40 |
| Sulfur, percent | 0.3 |

The results of this test-cracking are given in the table below.

A 70 gram sample (I) of the base catalyst was heated to 1100° F. in a fluidizing gas stream containing 50% $NO_2$, the balance air. The gas stream was passed through the catalyst at about atmospheric pressure for two hours. The sample was heated to 1175° F. and sulfided by fluidizing with $H_2S$ at this temperature for one hour. Next, the sample was cooled to 600° F. and was given a $Cl_2$–$CCl_4$ fluidized chlorination for one hour. Finally the sample was cooled to room temperature and given a water wash.

Another sample (II) was treated similarly to sample I but the high temperature oxygen treatment employed ordinary air. The results of this treatment are given in the table below. Another sample (III) was treated similarly to sample I, except that the contact with the 50-50 mixture of air and $NO_2$ was at about 800° F. The results of this treatment are also given in the table below.

TABLE

| Sample | A | I | II | III |
|---|---|---|---|---|
| Oxygen treatment: | | | | |
| Gas | | (¹) | Air | (¹) |
| Temperature (° F.) | | 1,100 | 1,100 | 800 |
| Time (Hrs.) | | 2 | 2 | |
| Metals Content: | | | | |
| NiO (p.p.m.) | 315 | 90 | 100 | 83 |
| $V_2O_5$ (p.p.m.) | 3,854 | 2,883 | 3,379 | 2,978 |
| Fe (Percent) | 0.300 | 0.814 | 0.213 | 0.179 |
| Percent Removal: | | | | |
| NiO | | 71 | 68 | 74 |
| $V_2O_5$ | | 26 | 12 | 23 |
| Fe | | 38 | 29 | 40 |
| Test Cracking: | | | | |
| Relative Activity | 34.8 | 46.8 | 44.0 | 56.8 |
| Distillate Plus Loss | 33.1 | 38.9 | 37.6 | 42.7 |
| Gas Factor | 1.38 | 1.24 | 1.37 | 1.20 |
| Coke Factor | 1.10 | 0.97 | 1.02 | 0.83 |
| Gas Gravity | 1.08 | 1.28 | 1.21 | 1.28 |

¹ 50% air, 50% $NO_2$.

It can thus be seen that performance of the elevated temperature treatment with oxygen-containing gas in the presence of an oxide of nitrogen greatly improves the vanadium removal from a catalyst possible by subsequent treatment steps and may provide for reduction in the temperature requirements of an effective treatment.

What is claimed is:

1. In a method for removing vanadium from a synthetic gel, silica-based cracking catalyst which has been poisoned by contamination with vanadium due to use of said catalyst in a cracking system, said cracking system including a catalytic cracking zone in which catalyst contacts at elevated temperature a heavier hydrocarbon feedstock containing vanadium, in which gasoline is produced and in which vanadium deposits on the catalyst, said cracking system including also a catalyst regeneration zone between which zone and the cracking zone the catalyst is cycled, and in which regeneration zone carbon is oxidized at an elevated temperature and thereby removed from the catalyst, said method for removing vanadium comprising bleeding a portion of the vanadium-contaminated catalyst from the cracking system, contacting bled, substantially carbon-free catalyst at an elevated temperature for at least about 15 minutes with a gas consisting essentially of molecular oxygen in an amount sufficient to enhance later vanadium removal, discontinuing contact with said gas containing molecular oxygen, subsequently removing vanadium from the oxygen-treated catalyst without undue deleterious change in the physical and chemical characteristics of the catalyst and returning resulting devanadized catalyst to a hydrocarbon cracking system, the improvement which comprises conducting said contact of carbon-free catalyst with oxygen-containing gas in the presence of an added amount of an oxide of nitrogen and at a temperature of about 600 to 1300° F., said oxide of nitrogen being present in an amount sufficient to enhance vanadium removal from the catalyst.

2. The method of claim 1 in which the catalyst is silica-alumina.

3. The method of claim 1 in which the gas employed in treating the substantially carbon-free catalyst contains at least about 1% oxygen.

4. The method of claim 3 in which the gas employed in treating the substantially carbon-free catalyst contains sufficient nitrogen oxide to supply at least about 0.2% based on the weight of the catalyst.

5. The method of claim 4 in which the nitrogen oxide is $NO_2$ and the catalyst is silica-alumina.

6. The method of claim 1 in which the nitrogen oxide is $NO_2$.

7. In a method for the removal of metal contaminants from a synthetic gel silica-alumina catalyst contaminated with vanadium and nickel from use in the cracking of a hydrocarbon feedstock containing vanadium and nickel, without undue deterioration of the catalyst, wherein the catalyst is regenerated to a substantially carbon-free condition, removed from the cracking system, treated to remove metal contaminant therefrom by a procedure which includes converting a substantial amount of the vanadium in the catalyst to a higher valence state by contact of the catalyst with a gas consisting essentially of molecular oxygen at an elevated temperature, sulfiding the poisoning metal by contact of the catalyst with a sulfiding vapor at a temperature of about 500 to 1500° F., chlorinating poisoning metal by contact of the catalyst with an essentially anhydrous chlorinating vapor at a temperature of about 300 to 1000° F. contacting the catalyst with a liquid essentially aqueous medium to remove soluble poisoning metal chloride from the catalyst and conducting the catalyst to said cracking system, the improvement which comprises conducting said contact of the catalyst with a gas consisting essentially of molecular oxygen in the presence of at least about 0.1%, based on the catalyst, of an added amount of an oxide of nitrogen at a temperature of about 600 to 1300° F.

8. In a method for removing metal contaminants from a synthetic gel, silica-based cracking catalyst which has been poisoned by contamination with vanadium and nickel due to use of said catalyst in a cracking system, said cracking system including a catalytic cracking zone in which catalyst contacts at elevated temperature a heavier hydrocarbon feedstock containing vanadium and nickel, in which gasoline is produced and in which vanadium and nickel deposit on the catalyst, said cracking system including also a catalyst regeneration zone between which zone and the cracking zone the catalyst is cycled, and in which regeneration zone carbon is oxidized at an elevated temperature and thereby removed from the catalyst, said method for removing vanadium comprising bleeding a portion of the nickel and vanadium-contaminated catalyst from the cracking system, contacting bled, substantially carbon-free catalyst at an elevated temperature for at least about 15 minutes with a gas consisting essentially of molecular oxygen and having a partial pressure of molecular oxygen of about 0.05 to 30 atmospheres, to enhance later vanadium removal, discontinuing contact with said gas containing molecular oxygen, sulfiding the poisoning metal by contact of the oxygen-treated catalyst with a sulfiding vapor at a temperature of about 500 to 1500° F., chlorinating poisoning metal by contact of the sulfided catalyst with an essentially anhydrous chlorinating vapor at a temperature of about 300 to 1,000° F., contacting the chlorinated catalyst with a liquid essentially aqueous medium to remove soluble poisoning metal chloride from the catalyst and returning resulting demetallized catalyst to a hydrocarbon cracking system, the improvement which comprises conducting said contact with oxygen-containing gas in the presence of at least about 0.1%, based on the weight of the catalyst, of an added amount of an oxide of nitrogen at a temperature of about 600 to 1300° F.

9. The method of claim 8 in which the oxygen-containing gas treatment is conducted at a temperature of about 800 to 1100° F.

10. The method of claim 8 in which the catalyst is silica-alumina.

11. The method of claim 10 in which the oxide of nitrogen is $NO_2$.

References Cited by the Examiner

UNITED STATES PATENTS

| | | | |
|---|---|---|---|
| 2,481,253 | 9/1949 | Snyder | 252—415 |
| 2,769,687 | 11/1959 | Porter et al. | 252—416 |
| 2,963,443 | 12/1960 | Nixon | 252—416 |
| 2,963,444 | 12/1960 | Nixon | 252—416 |
| 2,963,445 | 12/1960 | Nixon | 252—416 |
| 3,150,074 | 9/1964 | Smith et al. | 252—415 |
| 3,150,103 | 9/1964 | Anderson | 252—412 |

FOREIGN PATENTS 1,182,471  1/1959  France.

OTHER REFERENCES

Partington: "A Textbook of Inorganic Chemistry," Macmillan and Co., Ltd. London, England, 1950, pages 554–555.

Shankland: Advances in Catalysis, Academic Press Inc., vol. (VI) (1954), pp. 418, 420, QD 501A3.

MAURICE A. BRINDISI, *Examiner*.

BENJAMIN HENKIN, *Primary Examiner*.